US012216432B2

(12) United States Patent
Hatajiri

(10) Patent No.: US 12,216,432 B2
(45) Date of Patent: Feb. 4, 2025

(54) TONER

(71) Applicant: KYOCERA Document Solutions Inc., Osaka (JP)

(72) Inventor: Haruhiro Hatajiri, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 642 days.

(21) Appl. No.: 17/456,043

(22) Filed: Nov. 22, 2021

(65) Prior Publication Data

US 2022/0163902 A1 May 26, 2022

(30) Foreign Application Priority Data

Nov. 26, 2020 (JP) ................................ 2020-195952

(51) Int. Cl.
*G03G 9/097* (2006.01)
*G03G 9/087* (2006.01)

(52) U.S. Cl.
CPC ................................ *G03G 9/08773* (2013.01)

(58) Field of Classification Search
CPC ....................... G03G 9/09783; G03G 9/09775
See application file for complete search history.

(56) References Cited

U.S. PATENT DOCUMENTS 6,331,373 B1 12/2001 Kuramoto et al.
8,486,601 B2 7/2013 Hosoya et al.
2008/0102393 A1* 5/2008 Hasegawa .......... G03G 9/08755 399/258
2011/0070535 A1 3/2011 Hosoya et al.
2022/0128918 A1* 4/2022 Kototani ............ G03G 9/09775
2022/0128920 A1* 4/2022 Shirakawa .......... C08F 230/085

FOREIGN PATENT DOCUMENTS

JP H9-197706 A 7/1997
JP 2006-039023 A 2/2006
JP 2011-090297 A 5/2011
JP 2017-173829 A 9/2017

OTHER PUBLICATIONS

An Office Action mailed by the Japanese Patent Office on Jul. 9, 2024, which corresponds to Japanese Application No. 2020-195952 with English translation.

* cited by examiner

*Primary Examiner* — Peter L Vajda

(74) *Attorney, Agent, or Firm* — Studebaker & Brackett PC

(57) ABSTRACT

A toner includes toner particles. The toner particles each include a toner mother particle and an external additive attached to the surface of the toner mother particle. The external additive includes specific resin particles. The specific resin particles contains a specific resin having an alkoxysilyl group. The specific resin may include a first repeating unit derived from a specific monomer having the alkoxysilyl group and a (meth)acryloyl group.

3 Claims, 1 Drawing Sheet

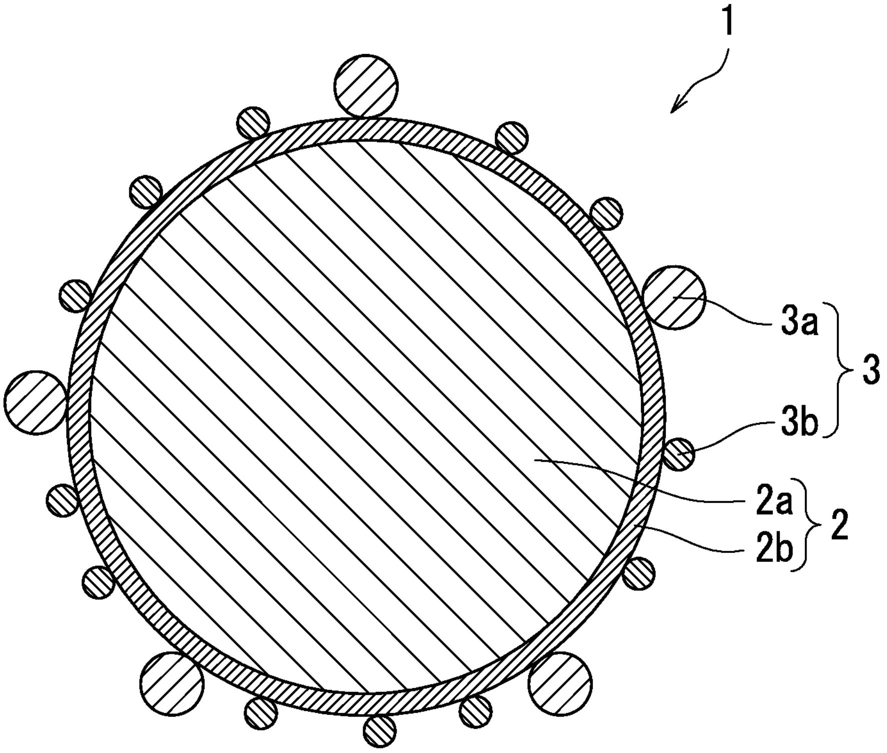
1
3a
3
3b
2a
2
2b

TONER

INCORPORATION BY REFERENCE

The present application claims priority under 35 U.S.C. § 119 to Japanese Patent Application No. 2020-195952, filed on Nov. 26, 2020. The contents of this application are incorporated herein by reference in their entirety.

BACKGROUND

The present disclosure relates to a toner.

A toner including toner particles is used for electrophotographic image formation. The toner particles each include a toner mother particle and an external additive attached to the surface of the toner mother particle, for example. There is proposed use of cross-linking resin fine particles, resin particles covered with inorganic layers, or inorganic fine particles as the external additive.

SUMMARY

A toner according to an aspect of the present disclosure includes toner particles. The toner particles each include a toner mother particle and an external additive attached to a surface of the toner mother particle. The external additive includes specific resin particles. The specific resin particles contain a specific resin having an alkoxysilyl group.

BRIEF DESCRIPTION OF THE DRAWINGS

FIGURE is a schematic cross-section of an example of a toner particle included in a toner according to the present disclosure.

DETAILED DESCRIPTION

The following describes a preferable embodiment of the present disclosure. Note that a toner is a collection (e.g., a powder) of toner particles. An external additive is a collection (e.g., a powder) of external additive particles. Unless otherwise stated, results (e.g., values indicating shapes or properties) of evaluations performed on a powder (more specifically, a powder of toner particles or a powder of external additive particles) each are a number average of values measured with respect to an appropriate number of the particles of the powder.

Measured values for volume median diameter ($D_{50}$) of a powder are value as measured based on the Coulter principle (electrical sensing zone technique) using "COULTER COUNTER MULTISIZER 3" produced by Beckman Coulter, Inc. unless otherwise stated.

Unless otherwise stated, the number average particle diameter of a powder is the number average value of equivalent circle diameters of primary particles of the powder (Heywood diameters: diameters of circles with the same areas as projected areas of the respective particles) as measured using a scanning electron microscope. The number average primary particle diameter of a powder is a number average value of equivalent circle diameters of 100 primary particles of the powder, for example. Note that the number average primary particle diameter of particles refers to a number average primary particle diameter of the particles of a powder unless otherwise stated.

Unless otherwise stated, chargeability refers to chargeability at triboelectric charging. For example, a measurement target (e.g., a toner) is triboelectrically charged by mixing and stirring the measurement target with a standard carrier (standard carrier for negatively chargeable toner use: N-01, standard carrier for positively chargeable toner use: P-01) provided by The Imaging Society of Japan. When the amount of charge of the measurement target is measured using for example a compact toner draw-off charge measurement system ("MODEL 212HS", product of TREK, INC.) before and after triboelectric charging, a larger change in the amount of charge between before and after triboelectric charging indicates stronger chargeability of the measurement target.

The term "main component" of a material refers to a component most contained in the material in terms of mass unless otherwise stated.

Hydrophobicity (or hydrophilicity) can be indicated by the contact angle of a water droplet (water wettability), for example. The larger the contact angle of a water droplet is, the stronger hydrophobicity is.

Unless otherwise stated, a softening point (Tm) is a value as measured using a capillary rheometer ("CFT-500D", product of Shimadzu Corporation). On an S-shaped curve (horizontal axis: temperature, vertical axis: stroke) plotted using the capillary rheometer, the softening point (Tm) corresponds to a temperature that corresponds to a stroke value of "((baseline stroke value)+(maximum stroke value))/2". Measured values for melting point (Mp) each are a temperature at the highest heat absorption peak on a heat absorption curve (vertical axis: heat flow (DSC signal), horizontal axis: temperature) plotted using a differential scanning calorimeter ("DSC-6220", product of Seiko Instruments Inc.) unless otherwise stated. The heat absorption peak rises due to melting of crystallization sites. Measured values for glass transition point (Tg) each are a value as measured using a differential scanning calorimeter ("DSC-6220", product of Seiko Instruments Inc.) in accordance with "Japanese Industrial Standards (JIS) K7121-2012" unless otherwise stated. On a heat absorption curve (vertical axis: heat flow (DSC signal), horizontal axis: temperature) plotted using a differential scanning calorimeter, the glass transition point (Tg) corresponds to a temperature at a point of change resulting from glass transition (specifically, a temperature at an intersection point of an extrapolation line of a base line and an extrapolation line of an inclined portion of the curve).

Measured values for acid value each are a value as measured in accordance with "Japanese Industrial Standards (JIS) K0070-1992" unless otherwise stated.

In the following description, the term "-based" may be appended to the name of a chemical compound in order to form a generic name encompassing both the chemical compound itself and derivatives thereof. When the term "-based" is appended to the name of a chemical compound to form a generic name of a polymer, it means that a repeating unit of the polymer is derived from the compound or a derivative thereof. Terms acryl and methacryl may be referred to collectively as "(meth)acryl".

<Toner>

An embodiment of the present disclosure relates to a toner. A toner according to the present disclosure includes toner particles. The toner particles each include a toner mother particle and an external additive attached to the surface of the toner mother particle. The external additive includes specific resin particles. The specific resin particles contain a specific resin having an alkoxysilyl group.

The toner of the present disclosure can be favorably used for example as a positively chargeable toner for development of electrostatic latent images. The toner of the present disclosure may be used as a one-component developer. Alternatively, the toner of the present disclosure may be mixed with a carrier using a mixer (e.g., a ball mill) for use as a two-component developer. The toner of the present disclosure used as a one-component developer is positively charged for example by friction with a development sleeve or a toner charging member in a development device. An example of the toner charging member is a doctor blade. The toner of the present disclosure constituting a two-component developer is positively charged for example by friction with a carrier in the development device. Details of the toner will be described below with reference to the accompanying drawing as appropriate.

FIGURE illustrates a toner particle 1 that is an example of the toner particles included in the toner of the present disclosure. The toner particle 1 illustrated in FIGURE includes a toner mother particle 2 and an external additive 3 attached to the surface of the toner mother particle 2. The toner mother particle 2 includes a toner core 2*a* and a shell layer 2*b* covering the toner core 2*a*. The toner mother particle 2 is a capsule toner particle including the shell layer 2*b*. The external additive 3 includes specific resin particles 3*a* and inorganic particles 3*b*. The specific resin particles 3*a* are larger in diameter than the inorganic particles 3*b*.

The shell layers 2*b* contain a resin (also referred to below as shell resin) as a main component, for example. As a result of the toner particles 1 including for example toner cores 2*a* that melt at low temperature and shell layers 2*b* excellent in heat resistance, both high-temperature preservability and low-temperature fixability of the toner can be achieved. The shell layers 2*b* may further contain an additive dispersed in the shell resin.

However, the toner particles included in the toner of the present disclosure may have a structure different from that of the toner particle 1 illustrated in FIGURE. Specifically, the specific resin particles may have a diameter equal to that of the inorganic particles or a diameter smaller than that of the inorganic particles. The specific resin particles and the inorganic particles may have a spherical shape or any other shape (e.g., cubic shape or rectangular parallelepiped shape). The external additive may include only the specific resin particles. Alternatively, the external additive may include additional external additive particles other than the specific resin particles and the inorganic particles. The toner particles may be non-capsule toner particles including toner mother particles with no shell layers. In each toner particle being a non-capsule toner particle, the shell layer 2*b* in FIGURE is omitted and the toner core 2*a* corresponds to the toner mother particle. Although it is preferable that the shell layers cover the entire surfaces of the toner cores, the shell layers may partially cover the surfaces of the toner cores. Details of the toner particles included in the toner of the present disclosure have been described so far with reference to FIGURE.

As a result of having the above features, the toner of the present disclosure has excellent transfer efficiency and charge stability. The reasons thereof are described below. The toner mother particles containing a resin have relatively high attachment strength to the surfaces thereof. As such, the toner readily attaches to a carrier or a photosensitive drum when the toner mother particles are directly used as a toner. A toner such as above is hardly transferred to a recording medium unless a strong electric field is applied. That is, when the toner mother particles are directly used as a toner, transfer efficiency of the toner decreases. From the above, toner particles including toner mother particles and an external additive that reduces attachment strength of the surfaces of the toner mother particles by being attached to the surfaces of the toner mother particles are typically used as a toner rather than direct use of the toner mother particles as a toner. Inorganic particles having surfaces with relatively low attachment strength are typically used as the external additive. The inorganic particles are subjected to surface treatment for providing a desired property to the toner in many cases. In particular, treatment for rendering the surfaces of the inorganic particles positively chargeable is performed in many cases when the inorganic particles are used as an external additive for a positively chargeable toner. This is because inorganic particles not subjected to the surface treatment typically have negative chargeability. However, in a toner including as an external additive the inorganic particles subjected to the surface treatment, the surfaces of the inorganic particles vary in property with long-term use, resulting in tendency for chargeability of the toner to readily vary. For the reason as above, the toner including the inorganic particles as an external additive tends to have insufficient charge stability. By contrast, a toner including resin particles as an external additive is excellent in charge stability. However, it is difficult for the resin particles to sufficiently reduce attachment strength of the surfaces of the toner mother particles. Therefore, the toner including the resin particles as an external additive tends to have insufficient transfer efficiency.

By contrast, the toner of the present disclosure includes the specific resin particles containing the specific resin as an external additive. The specific resin has an alkoxysilyl group containing a silicon atom. Therefore, the specific resin provides a property close to that of an inorganic component to the surfaces of the specific resin particles. This can enable the specific resin particles to sufficiently reduce attachment strength of the surfaces of the toner mother particles. Furthermore, the property of the surfaces of the specific resin particles hardly varies in a toner including the specific resin particles as an external additive even after long-term use. From the above, the toner of the present disclosure has excellent transfer efficiency and charge stability.

The toner will be described below further in detail. Note that one type of each component described below may be used independently or two or more types of the component may be used in combination unless otherwise stated.

[External Additive]

The external additive is attached to the surfaces of the toner mother particles. The external additive includes specific resin particles. Preferably, the external additive further includes inorganic particles. The external additive may include additional external additive particles other than the specific resin particles and the inorganic particles. Examples of the additional external additive particles include particles of organic acid compounds such as fatty acid metal salts (a specific example is zinc stearate) and resin particles not containing the specific resin.

[Specific Resin Particles]

The specific resin particles contain a specific resin having an alkoxysilyl group. In the toner of the present disclosure, the content ratio of the specific resin particles is preferably at least 0.1 parts by mass and no greater than 5.0 parts by mass relative to 100 parts by mass of the toner mother particles, and more preferably at least 0.5 parts by mass and no greater than 2.0 parts by mass. As a result of the content ratio of the specific resin particles being set to at least 0.1 parts by mass, transfer efficiency and charge stability of the toner of the present disclosure can be further increased. As a result of the content ratio of the specific resin particles being set to no greater than 5.0 parts by mass, occurrence of a phenomenon in which the specific resin particles detach from the surfaces of the toner mother particles can be inhibited.

The specific resin particles have a number average primary particle diameter of preferably at least 40 nm and no greater than 250 nm, more preferably at least 100 nm and no greater than 200 nm, and further preferably at least 150 nm and no greater than 190 nm. As a result of the number average primary particle diameter of the specific resin particles being set to at least 40 nm, occurrence of a phenomenon in which the specific resin particles are embedded in the surfaces of the toner mother particles can be inhibited. As a result of the number average primary particle diameter of the specific resin particles being set to no greater than 250 nm, occurrence of the phenomenon in which the specific resin particles detach from the surfaces of the toner mother particles can be inhibited. From the above, transfer efficiency and charge stability of the toner of the present disclosure can be further increased as a result of the number average primary particle diameter of the specific resin particles being set to at least 40 nm and no greater than 250 nm.

In a case in which the external additive further includes inorganic particles in addition to the specific resin particles, the specific resin particles preferably have a number average primary particle diameter larger than the number average primary particle diameter of the inorganic particles. When the specific resin particles have a larger diameter than the inorganic particles as above, the specific resin particles can function as spacers for inhibiting the phenomenon in which the inorganic particles are embedded in the surfaces of the toner mother particles and the phenomenon in which the inorganic particles detach from the surfaces of the toner mother particles.

The percentage content of the specific resin in the specific resin particles is preferably at least 90% by mass, more preferably at least 95% by mass, and further preferably 100% by mass.

(Specific Resin)

The specific resin has an alkoxysilyl group. Examples of the specific resin include vinyl resins (e.g., styrene resin, acrylic resin, styrene-acrylic resin, polyethylene resin, polypropylene resin, vinyl chloride resin, polyvinyl alcohol, vinyl ether resin, and N-vinyl resin), polyester resins, polyamide resins, and urethane resins. Preferably, the specific resin is an acrylic resin or a styrene-acrylic resin.

Preferably, the alkoxysilyl group of the specific resin is represented by the following general formula (1).

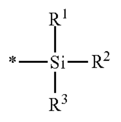

(1)

In general formula (1), $R^1$ represents an alkoxy group having a carbon number of at least 1 and no greater than 3. $R^2$ and $R^3$ each represent, independently of one another, an alkyl group having a carbon number of at least 1 and no greater than 3 or an alkoxy group having a carbon number of at least 1 and no greater than 3. * represents a bond.

Examples of the alkoxy group having a carbon number of at least 1 and no greater than 3 include a methoxy group, an ethoxy group, an n-propoxy group, and an isopropoxy group.

Examples of the alkyl group having a carbon number of at least 1 and no greater than 3 include a methyl group, an ethyl group, an n-propyl group, and an isopropyl group.

Preferably, $R^1$ represents a methoxy group. Preferably, $R^2$ and $R^3$ each represent, independently of one another, a methoxy group or a methyl group.

Preferably, the alkoxysilyl group is a trimethoxysilyl group or a methyldimethoxysilyl group.

Preferably, the specific resin includes a first repeating unit derived from a specific monomer having an alkoxysilyl group and a (meth)acryloyl group. The specific monomer is preferably a compound represented by the following general formula (2) or (3).

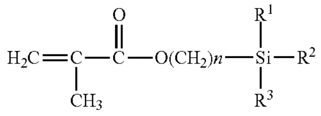

(2)

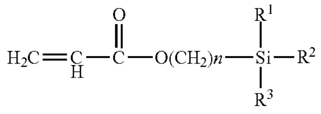

(3)

In general formulas (2) and (3), $R^1$ to $R^3$ are the same as defined for $R^1$ to $R^3$ in general formula (1), respectively. n represents an integer of at least 1 and no greater than 5. Preferably, n represents 3.

Specific examples of the specific monomer include 3-(trimethoxysilyl)propyl methacrylate, 3-(methyldimethoxysilyl)propyl methacrylate, and 3-(trimethoxysilyl)propyl acrylate.

The percentage content of the first repeating unit is preferably at least 10% by mass and no greater than 35% by mass relative to all repeating units in the specific resin, and more preferably at least 20% by mass and no greater than 30% by mass.

Preferably, the specific resin further includes a second repeating unit derived from at least one of (meth)acrylic acid alkyl ester and styrene.

Examples of the (meth)acrylic acid alkyl ester include methyl (meth)acrylate, ethyl (meth)acrylate, n-propyl (meth)acrylate, iso-propyl (meth)acrylate, butyl (meth)acrylates (specific examples include n-butyl (meth)acrylate and sec-butyl (meth)acrylate), and 2-ethylhexyl (meth)acrylate.

Preferably, the second repeating unit is a repeating unit derived from methyl methacrylate, styrene, ethyl acrylate, or butyl acrylate.

The percentage content of the second repeating unit is preferably at least 10% by mass and no greater than 80% by mass relative to all repeating units in the specific resin, and more preferably at least 15% by mass and no greater than 30% by mass.

Preferably, the specific resin further includes a third repeating unit derived from a cross-linking agent. The third repeating unit forms a cross-linking structure in the specific resin. As a result of the specific resin including the third repeating unit, the specific resin particles have appropriate elasticity. As such, occurrence of the phenomenon in which the specific resin particles are embedded in the surfaces of the toner mother particles can be inhibited. The cross-linking agent preferably has two or more unsaturated bonds. It is good if the unsaturated bonds constitute a vinyl group or a (meth)acryloyl group.

Examples of the cross-linking agent include N,N'-methylene-bisacrylamide, divinylbenzene, ethylene glycol diacrylate, ethylene glycol dimethacrylate, diethylene glycol diacrylate, tetraethylene glycol diacrylate, polyethylene glycol diacrylate, 1,4-butanediol diacrylate, 1,6-hexanediol diacrylate, tripropylene glycol diacrylate, trimethylolpropane triacrylate, pentaerythritol triacrylate, pentaerythritol tetraacrylate. 1,4-butanediol dimethacrylate, and 1,6-hexanediol dimethacrylate. The cross-linking agent is preferably divinylbenzene or ethylene glycol diacrylate.

The percentage content of the third repeating unit is preferably at least 20% by mass and no greater than 80% by mass relative to all repeating units in the specific resin, and more preferably at least 40% by mass and no greater than 60% by mass.

The specific resin may further include a fourth repeating unit derived from (meth)acrylic acid hydroxyalkyl ester.

Examples of the (meth)acrylic acid hydroxyalkyl ester include 2-hydroxyethyl (meth)acrylate. 3-hydroxypropyl (meth)acrylate, 2-hydroxypropyl (meth)acrylate, and 4-hydroxybutyl (meth)acrylate. The (meth)acrylic acid hydroxyalkyl ester is preferably 2-hydroxyethyl acrylate.

The percentage content of the fourth repeating unit is preferably at least 1% by mass and no greater than 10% by mass relative to all repeating units in the specific resin, and more preferably at least 3% by mass and no greater than 7% by mass.

Note that the specific resin may further include an additional repeating unit other than the first to fourth repeating units.

The specific resin is preferably a resin derived from a cross-linking agents and monomer(s) in any of the following combinations 1 to 8.

Combination 1: methyl methacrylate, 3-(trimethoxysilyl) propyl methacrylate, and ethylene glycol dimethacrylate Combination 2: methyl methacrylate, styrene, 3-(trimethoxysilyl)propyl methacrylate, and ethylene glycol dimethacrylate Combination 3: methyl methacrylate, 3-(methyldimethoxysilyl)propyl methacrylate, and ethylene glycol dimethacrylate Combination 4: methyl methacrylate, 3-(trimethoxysilyl) propyl acrylate, and ethylene glycol dimethacrylate Combination 5: ethyl acrylate, 3-(trimethoxysilyl)propyl methacrylate, and ethylene glycol dimethacrylate Combination 6: butyl acrylate, 2-hydroxyethyl acrylate, 3-(trimethoxysilyl)propyl methacrylate, and ethylene glycol dimethacrylate Combination 7: methyl methacrylate, 3-(trimethoxysilyl) propyl methacrylate, and divinylbenzene Combination 8: ethyl acrylate, butyl acrylate, and 3-(trimethoxysilyl)propyl methacrylate (Preparation of Specific Resin Particles)

The specific resin particles can be obtained for example by emulsion polymerization of a cross-linking agent and a monomer that are the raw materials of the specific resin particles, and drying and breaking the resultant emulsion. In emulsion polymerization, dodecyltrimethyl ammonium chloride can for example be used as an emulsifier used for emulsion polymerization.

[Inorganic Particles]

Examples of the inorganic particles include silica particles and particles of metal oxides (e.g., alumina, titanium oxide, magnesium oxide, and zinc oxide). The inorganic particles are preferably silica particles (particularly, silica particles rendered positively chargeable by surface treatment).

The inorganic particles have a number average primary particle diameter of preferably at least 1 nm and no greater than 100 nm, and more preferably at least 5 nm and no greater than 35 nm.

In terms of sufficiently exhibiting the function of the inorganic particles while inhibiting detachment of the inorganic particles from the toner mother particles, the content ratio of the inorganic particles in the toner particles is preferably 0.1 parts by mass and no greater than 15.0 parts by mass relative to 100 parts by mass of the toner mother particles, and more preferably at least 1.0 part by mass and no greater than 5.0 parts by mass.

[Toner Mother Particles]

No particular limitations are placed on the toner mother particles, and toner mother particles in any known toners can be used. Examples of the toner mother particles include toner mother particles each including a toner core and a shell layer covering the surface of the toner core, and toner mother particles each including only a toner core.

In terms of formation of favorable images, the toner mother particles preferably have a volume median diameter ($D_{50}$) of at least 4 μm and no greater than 9 μm.

(Toner Cores)

The toner cores contain a binder resin as a main component, for example. The toner cores may further contain an internal additive (e.g., at least one of a colorant, a releasing agent, a charge control agent, and a magnetic powder) as necessary. Examples of a production method of the toner cores include a pulverization method and an aggregation method, and the pulverization method is preferable.

(Binder Resin)

In terms of providing excellent low-temperature fixability to the toner, the toner cores preferably contain a thermoplastic resin as the binder resin and further preferably contain the thermoplastic resin at a percentage content of at least 85% by mass relative to the total of the binder resin. Examples of the thermoplastic resin include styrene resins, acrylic acid ester resins, olefin resins (e.g., polyethylene resin and polypropylene resin), vinyl resins (e.g., vinyl chloride resin, polyvinyl alcohol, vinyl ether resin, and N-vinyl resin), polyester resins, polyamide resins, and urethane resins. Alternatively, a copolymer of any of the above resins, that is, a copolymer (e.g., a styrene-acrylic ester resin or a styrene-butadiene resin) in which any repeating unit has been introduced into any of the above resins can be used as the binder resin.

The percentage content of the binder resin in the toner cores is preferably at least 60% by mass and no greater than 95% by mass, and more preferably at least 75% by mass and no greater than 90% by mass.

The thermoplastic resin can be obtained by addition polymerization, copolymerization, or condensation polymerization of at least on thermoplastic monomer. Note that the thermoplastic monomer is a monomer (e.g., a (meth)acrylic acid ester monomer or a styrene monomer) that forms a thermoplastic resin by homopolymerization, or a monomer (e.g., a combination of a polyhydric alcohol and a polybasic carboxylic acid that form a polyester resin by condensation polymerization) that forms a thermoplastic resin by condensation polymerization.

In order to increase low-temperature fixability of the toner of the present disclosure, the toner cores preferably contain a polyester resin as the binder resin. The polyester resin is preferably a mixed resin of a crystalline polyester resin and a non-crystalline polyester resin. As a result of the toner cores containing a crystalline polyester resin and a non-crystalline polyester resin as the binder resin, low-temperature fixability can be increased while increasing dispersibility of a later-described colorant. In this case, the mixing ratio between the crystalline polyester resin and the non-crystalline polyester resin is not limited specifically. However, it is sufficient that the crystalline polyester resin in a range of at least 1 part by mass and no greater than 30 parts by mass is mixed with 100 parts by mass of the non-crystalline polyester resin, for example.

In a case in which the toner cores contain a crystalline polyester resin and a non-crystalline polyester resin, the toner cores preferably contain a crystalline polyester resin with a softening point of no higher than 90° C. and a non-crystalline polyester resin with a softening point of at least 100° C. in order to achieve both high-temperature preservability and low-temperature fixability of the toner of the present disclosure.

In order that the toner cores have appropriate sharp meltabilty, the toner cores preferably contain a crystalline polyester resin with a crystallinity index of at least 0.90 and no greater than 1.20 as the binder resin. The crystallinity index of a polyester resin can be adjusted by changing each type or each amount of use (blending ratio) of materials for synthesis of the polyester resin. Note that the crystallinity index of a resin corresponds to a ratio (Tm/Mp) of the softening point (Tm, unit: ° C.) of the resin to the melting point (Mp, unit: ° C.) of the resin. No definite melting point can be determined for a non-crystalline resin in many cases. Therefore, a resin of which definite heat absorption peak cannot be determined on a heat absorption curve plotted using a differential scanning calorimeter can be determined to be a non-crystalline resin.

A polyester resin can be obtained by condensation polymerization of at least one polyhydric alcohol and at least one polybasic carboxylic acid. Examples of the polyhydric alcohol for synthesis of a polyester resin include dihydric alcohols (specific examples include diol compounds and bisphenol compounds) and tri- or higher-hydric alcohols listed below. Examples of the polybasic carboxylic acid for synthesis of a polyester resin include dibasic carboxylic acids and tri- or higher-basic carboxylic acids listed below. Note that a polybasic carboxylic acid anhydride may be used instead of the polybasic carboxylic acid.

Examples of the diol compounds include ethylene glycol, diethylene glycol, triethylene glycol, 1,2-propanediol, 1,3-propanediol, 1,4-butanediol, neopentyl glycol, 2-butene-1,4-diol, 1,5-pentanediol, 2-pentene-1,5-diol, 1,6-hexanediol, 1,4-cyclohexanedimethanol, dipropylene glycol, 1,4-benzenediol, polyethylene glycol, polypropylene glycol, and polytetramethylene glycol.

Examples of the bisphenol compounds include bisphenol A, hydrogenated bisphenol A, bisphenol A ethylene oxide adduct, and bisphenol A propylene oxide adduct.

Examples of the tri- or higher-hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, diglycerol, 2-methylpropanetriol 2-methyl-1,2,4-butanetriol, trimethylolethane, trimethylolpropane, and 1,3,5-trihydroxymethylbenzene.

Examples of the dibasic carboxylic acids include maleic acid, fumaric acid, citraconic acid, itaconic acid, glutaconic acid, phthalic acid, isophthalic acid, terephthalic acid, cyclohexanedicarboxylic acid, adipic acid, sebacic acid, azelaic acid, malonic acid, succinic acid, alkyl succinic acids (examples include n-butylsuccinic acid, isobutylsuccinic acid, n-octylsuccinic acid, n-dodecylsuccinic acid, and isododecylsuccinic acid), and alkenyl succinic acids (examples include n-butenylsuccinic acid, isobutenylsuccinic acid, n-octenylsuccinic acid, n-dodecenylsuccinic acid, and isododecenylsuccinic acid).

Examples of the tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylene-carboxylpropane, 1,2,4-cyclohexanetricarboxylic acid, tetra(methylenecarboxyl)methane, 1,2,7,8-octanetetracarboxylic acid, pyromellitic acid, and Empol trimer acid.

Examples of a preferable polyhydric alcohol for synthesis of a crystalline polyester resin include α,ω-alkanediols (e.g., ethylene glycol, 1,4-butanediol, and 1,6-hexanediol) having a carbon number of at least 2 and no greater than 8. Examples of a preferable polybasic carboxylic acid for synthesis of a crystalline polyester resin include α,ω-alkanedicarboxylic acids (e.g., succinic acid and sebacic acid) having a carbon number (carbon number including the carbon number for a carboxy group) of at least 4 and no greater than 10.

Examples of a preferable polyhydric alcohol for synthesis of a non-crystalline polyester resin include bisphenols (e.g., bisphenol A ethylene oxide adduct and bisphenol A propylene oxide adduct). Examples of a preferable polybasic carboxylic acid for synthesis of a non-crystalline polyester resin include aromatic dicarboxylic acids (e.g., terephthalic acid) and unsaturated dicarboxylic acids (e.g., fumaric acid).

Furthermore, in a case in which the toner cores are produced by a later-described pulverization method using a crystalline polyester resin and a non-crystalline polyester resin, it is preferable to additionally use a styrene-(meth)acrylic acid ester resin as the binder resin. It is thought that interfaces increases because the crystalline polyester resin and the non-crystalline polyester resin are hardly compatible with each other in a melt-kneading process of the pulverization method as a result of the binder resin including a styrene-(meth)acrylic acid ester resin. Therefore, pulverizability of a melt-knead product tends to increase.

Examples of a styrene monomer for synthesis of the styrene-(meth)acrylic acid ester resin include styrene, o-methylstyrene, m-methylstyrene, p-methylstyrene, p-phenylstyrene, p-ethylstyrene. 2,4-dimethylstyrene, p-t-butylstyrene, p-n-hexylstyrene, p-n-octylstyrene, p-n-nonylstyrene, p-n-decylstyrene, and p-n-dodecylstyrene.

Examples of a (meth)acrylic acid ester monomer for synthesis of the styrene-(meth)acrylic acid ester resin include methyl (meth)acrylate, ethyl (meth)acrylate, n-propyl (meth)acrylate, isopropyl (meth)acrylate, n-butyl (meth) acrylate, isobutyl (meth)acrylate, t-butyl (meth)acrylate, n-octyl (meth)acrylate, 2-ethylhexyl (meth)acrylate, stearyl (meth)acrylate, lauryl (meth)acrylate, and phenyl (meth) acrylate.

(Colorant)

The toner cores may contain a colorant. The colorant can be for example a known pigment or dye that matches the color of the toner of the present disclosure. In terms of forming high-quality images with the toner of the present disclosure, the content ratio of the colorant is preferably at least 1 part by mass and no greater than 20 parts by mass relative to 100 parts by mass of the binder resin.

The toner cores may contain a black colorant. An example of the black colorant is carbon black. The black colorant may be a colorant whose color is adjusted to black using a yellow colorant, a magenta colorant, and a cyan colorant.

The toner cores may contain a non-black colorant. Examples of the non-black colorant include a yellow colorant, a magenta colorant, and a cyan colorant.

At least one compound selected from the group consisting of a condensed azo compound, an isoindolinone compound, an anthraquinone compound, an azo metal complex, a methine compound, and an arylamide compound can be used as the yellow colorant. Examples of the yellow colorant include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S. Hansa Yellow G, and C.I. Vat Yellow.

At least one compound selected from the group consisting of a condensed azo compound, a diketopyrrolopyrrole compound, an anthraquinone compound, a quinacridone compound, a basic dye lake compound, a naphthol compound, a benzimidazolone compound, a thioindigo compound, and a perylene compound can be used as the magenta colorant. Examples of the magenta colorant include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

At least one compound selected from the group consisting of a copper phthalocyanine compound, an anthraquinone compound, and a basic dye lake compound can be used as the cyan colorant. Examples of the cyan colorant include C.I. Pigment Blue (1, 7, 15, 15:1, 15:2, 15:3, 15:4, 60, 62, or 66), Phthalocyanine Blue. C.I. Vat Blue, and C.I. Acid Blue.

(Releasing Agent)

The toner cores may contain a releasing agent. The releasing agent is used for the purpose to provide offset resistance to the toner of the present disclosure, for example. In terms of providing sufficient offset resistance to the toner of the present disclosure, the content ratio of the releasing agent is preferably at least 1 part by mass and no greater than 20 parts by mass relative to 100 parts by mass of the binder resin.

Examples of the releasing agent include aliphatic hydrocarbon-based waxes, oxides of aliphatic hydrocarbon-based waxes, plant waxes, animal waxes, mineral waxes, ester waxes having a fatty acid ester as a main component, and waxes in which a fatty acid ester has been partially or fully deoxidized. Examples of the aliphatic hydrocarbon-based waxes include low molecular weight polyethylene, low molecular weight polypropylene, polyolefin copolymers, polyolefin wax, microcrystalline wax, paraffin wax, and Fischer-Tropsch wax. Examples of the oxides of aliphatic hydrocarbon-based waxes include oxidized polyethylene waxes and block copolymers of oxidized polyethylene waxes. Examples of the plant waxes include candelilla wax, carnauba wax, Japan wax, jojoba wax, and rice wax. Examples of the animal waxes include beeswax, lanolin, and spermaceti. Examples of the mineral waxes include ozokerite, ceresin, and petrolatum. Examples of the ester waxes having a fatty acid ester as a main component include montanic acid ester wax and castor wax. Examples of the waxes in which a fatty acid ester has been partially or fully deoxidized include deoxidized carnauba wax. Preferably, the releasing agent is carnauba wax.

In a case in which the toner cores contain a releasing agent, a compatibilizer may be added to the toner cores in order to improve compatibility between the binder resin and the releasing agent.

(Charge Control Agent)

The toner cores may contain a charge control agent. The charge control agent is used for the purpose to provide a toner with further excellent charge stability or excellent charge rise characteristic, for example. The charge rise characteristic of a toner is an indicator as to whether or not the toner can be charged to a specific charging level in a short period of time. Cationic strength of the toner cores can be increased by the toner cores containing a positively chargeable charge control agent.

Examples of the positively chargeable charge control agent include azine compounds, direct dyes, acid dyes, alkoxylated amine, alkylamide, quaternary ammonium salt compounds, and resins having a quaternary ammonium cation group. Preferably, the charge control agent is a quaternary ammonium salt compound.

Examples of the azine compounds include pyridazine, pyrimidine, pyrazine, 1,2-oxazine, 1,3-oxiazine, 1,4-oxiazine, 1,2-thiazine, 1,3-thiazine, 1,4-thiazine, 1,2,3-triazine, 1,2,4-triazine, 1,3,5-triazine, 1,2,4-oxadiazine, 1,3,4-oxadiazine, 1,2,6-oxadiazine, 1,3,4-thiadiazine, 1,3,5-thiadiazine, 1,2,3,4-tetrazine, 1,2,4,5-tetrazine, 1,2,3,5-tetrazine, 1,2,4,6-oxatriazine, 1,3,4,5-oxatriazine, phthalazine, quinazoline, and quinoxaline.

Examples of the direct dyes include Azine Fast Red FC, Azine Fast Red 12BK, Azine Violet BO, Azine Brown 3G, Azine Light Brown GR, Azine Dark Green BH/C, Azine Deep Black EW, and Azine Deep Black 3RL.

Examples of the acid dyes include Nigrosine BK, Nigrosine NB, and Nigrosine Z.

Examples of the quaternary ammonium salt compounds include benzyldecylhexylmethylammonium chloride, decyltrimethyl ammonium chloride, 2-(methacryloyloxy)ethyltrimethylammonium chloride, and dimethylaminopropyl acrylamide methyl chloride quaternary salt.

In terms of providing a toner with further excellent charge stability, the content ratio of the charge control agent is preferably at least 0.1 parts by mass and no greater than 10 parts by mass relative to 100 parts by mass of the binder resin.

(Shell Layers)

The shell layers are substantially constituted by a shell resin. Any of thermosetting resin, thermoplastic resin, and mixtures of thermosetting resin and thermoplastic resin can be used as the shell resin. The shell resin is preferably a thermoplastic resin. In a case in which the shell layers contain both a thermosetting resin and a thermoplastic resin, any ratio between the thermosetting resin and the thermoplastic resin in the shell layers is possible.

In a case in which the binder resin of the toner cores contains a polyester resin, the shell layers preferably contain a vinyl resin including a fifth repeating unit represented by the following general formula (4) and a sixth repeating unit represented by the following general formula (5). In the following, the vinyl resin including the fifth repeating unit and the sixth repeating unit may be referred to as vinyl resin A.

(4)

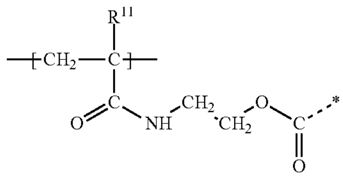

In general formula (4), $R^{11}$ represents a hydrogen atom or an optionally substituted alkyl group. The alkyl group includes a straight chain alkyl group, a branched chain alkyl group, and a cyclic alkyl group. Preferably, $R^{11}$ represents a hydrogen atom, a methyl group, an ethyl group, or an isopropyl group. Furthermore, * in general formula (4) represents a moiety connected to an atom in the polyester resin constituting the binder resin.

(5)

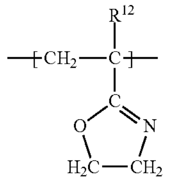

In general formula (5), $R^{12}$ represents a hydrogen atom or an optionally substituted alkyl group. The alkyl group includes a straight chain alkyl group, a branched chain alkyl group, and a cyclic alkyl group. Preferably, $R^{12}$ represents a hydrogen atom, a methyl group, an ethyl group, or an isopropyl group.

The vinyl resin A includes the sixth repeating unit having an oxazoline group (non-ring-opened group). Due to the oxazoline group having strong positive chargeability, a positively chargeable toner excellent in chargeability can be provided when the shell layers contain the vinyl resin A. Examples of a material that can be used for forming the shell layers containing the vinyl resin A include aqueous polymer solutions ("EPOCROS (registered Japanese trademark) WS SERIES", products of NIPPON SHOKUBAI CO., LTD.) having an oxazoline group. "EPOCROS (registered Japanese trademark) WS-300" and "EPOCROS (registered Japanese trademark) WS-700" each contain a polymer of a monomer (resin material) including 2-vinyl-2-oxazoline and at least one (meth)acrylic acid alkyl ester. An example of a shell layer formation method using an aqueous polymer solution having an oxazoline group is a method described later in Examples, for example.

[Toner Production Method]

The toner of the present disclosure can be produced according to a method including for example a process (toner mother particle preparation process) of preparing the toner mother particles and a process (external additive addition process) of obtaining the toner particles by attaching the external additive including the specific resin particles to the surfaces of the toner mother particles. The following describe each of the processes.

(Toner Mother Particle Preparation Process)

In the toner mother particle preparation process, the toner cores are prepared for example by a pulverization method or an aggregation method.

An example of the pulverization method is described below. First, the binder resin and an internal additive to be added as necessary are mixed. Subsequently, the resultant mixture is melt-kneaded using a melt-kneading apparatus (e.g., a single or twin screw extruder). Subsequently, the resultant melt-knead product was pulverized and classified. Through the above, the toner cores are obtained.

An example of the aggregation method is described next. First, fine particles of the binder resin and fine particles of an internal additive to be added as necessary are caused to aggregate in an aqueous medium containing these fine particles until the fine particles have a desired particle diameter. This forms aggregated particles containing the binder resin and the like. Subsequently, the resultant aggregated particles are heated to cause the components contained in the aggregated particles to coalesce. Through the above, the toner cores are obtained.

In this process, the obtained toner cores may be directly used as the toner mother particles. Alternatively, it is possible in this process to perform the following shell layer formation on the toner cores to form shell layers on the surfaces of the toner cores. In this case, the obtained toner mother particles each include a toner core and a shell layer.

(Shell Layer Formation Process)

Examples of a shell layer formation method include in-situ polymerization, in-liquid curing film coating, and coacervation. The following method is a preferable specific example thereof.

First, the toner cores are added to an aqueous medium in which the material (shell material) for forming shell layers has been dissolved. Next, the aqueous medium containing the toner cores is heated. This allows polymerization reaction of the shell materials (or cross-linking reaction among molecules of the shell material) to proceed. As a result, shell layers are formed on the surfaces of the toner cores.

(External Additive Addition Process)

In this process, the external additive including the specific resin particles is attached to the surfaces of the toner mother particles to obtain the toner particles. No particular limitations are placed on a method for attaching the external additive to the surfaces of the toner mother particles, and an example of the method is a method in which the toner mother particles and the external additive are stirred using for example a mixer.

EXAMPLES

The present disclosure will be described further in detail using examples. However, the present disclosure is not limited to the scope of the examples.

(Synthesis of Crystalline Resin (CR-1))

A four-necked flask (reaction vessel) equipped with a thermometer, a nitrogen inlet tube, a stirrer (stainless steel stirring impeller), and a falling-type condenser (heat exchanger) was set in a heating mantle. Into the reaction vessel, 69.0 g of ethylene glycol, 214.0 g of sebacic acid, and 54.0 g of tin(II) 2-ethylhexanoate were added. Next, a nitrogen atmosphere was created in the inside of the reaction vessel and the reaction vessel was heated over 2 hours until the contents of the reaction vessel reached a temperature of 235° C. Next, the contents of the reaction vessel were stirred while maintaining the nitrogen atmosphere in the inside of the reaction vessel and keeping the contents of the reaction vessel at a temperature of 235° C. to cause a condensation polymerization reaction of the contents of the reaction vessel. The condensation polymerization reaction was allowed to continue until the reaction completion rate of the contents of the reaction vessel reached 95% by mass. The reaction completion rate was calculated using a formula "(reaction completion rate)=100×(actual amount of reaction product water)/(theoretical amount of reaction product water)".

After the condensation polymerization reaction, the reaction vessel was cooled until the contents of the reaction vessel reached a temperature of 160° C. Next, a mixed liquid of 156.0 g of styrene, 195.0 g of n-butyl methacrylate, and 0.5 g of di-tert-butyl peroxide was dripped into the reaction vessel over 1 hours using a dripping funnel. Next, the contents of the reaction vessel were further stirred for 30 minutes while keeping the temperature of the contents of the reaction vessel at 160° C. Next, pressure reduction was performed on the reaction vessel until the internal pressure of the reaction vessel reached 8.0 kPa and the reaction vessel was heated then until the contents of the reaction vessel reached a temperature of 200° C. Next, the contents of the reaction vessel were allowed to react for 1 hour while keeping the internal pressure of the reaction vessel at 8.0 kPa and keeping the temperature of the contents of the reaction vessel at 200° C. Next, the reaction vessel was cooled until the contents of the reaction vessel reached a temperature of 180° C. Next, the internal pressure of the reaction vessel was returned to the standard pressure. Next, 1.0 g of 4-tert-butylcatechol being a radical polymerization inhibitor was added into the reaction vessel. Next, pressure reduction was performed on the reaction vessel until the internal pressure of the reaction vessel reached 8.0 kPa and the reaction vessel was then heated over 2 hours until the contents of the reaction vessel reached a temperature of 210° C. Next, the contents of the reaction vessel were allowed to react for 1 hour while keeping the internal pressure of the reaction vessel at 8.0 kPa and keeping the temperature of the contents of the reaction vessel at 210° C. Next, pressure application was performed on the inside of the reaction vessel until the internal pressure of the reaction vessel reached 40.0 kPa. Next, the contents of the reaction vessel was allowed to react for 2 hours while keeping the internal pressure of the reaction vessel at 40.0 kPa and keeping the temperature of the contents of the reaction vessel at 210° C. As a result, a crystalline resin (CR-1) being a composite resin of a crystalline polyester resin and styrene-butyl methacrylate copolymer was obtained. The obtained crystalline resin (CR-1) had a crystallinity index (i.e., Tm/Mp) of 1.05. The crystalline resin (CR-1) had an acid value of 15 mgKOH/g.

(Synthesis of Non-Crystalline Resin (AR-1))

A four-necked flask (reaction vessel) was prepared. The four-necked flask was equipped with a thermometer, a nitrogen inlet tube, a stirrer (stainless steel stirring impeller), and a falling-type condenser (heat exchanger). The reaction vessel was charged with 100.0 g of bisphenol A ethylene oxide adduct (average number of moles added of ethylene oxide: 2 mol), 100.0 g of bisphenol A propylene oxide adduct (average number of moles added of propylene oxide: 2 mol), 50.0 g of terephthalic acid. 30.0 g of adipic acid, and 54.0 g of tin(II) 2-ethylhexanoate. Next, a nitrogen atmosphere was created in the inside of the reaction vessel and then the reaction vessel was heated under stirring of the contents of the reaction vessel until the contents of the reaction vessel reached a temperature of 235° C. Next, the contents of the reaction vessel were stirred while maintaining the nitrogen atmosphere in the inside of the reaction vessel and keeping the temperature of the contents of the reaction vessel at 235° C. to cause a condensation polymerization reaction of the contents of the reaction vessel. The condensation polymerization reaction was allowed to continue until all the resin raw materials (bisphenol A ethylene oxide adduct, bisphenol A propylene oxide adduct, terephthalic acid, and adipic acid) were dissolved. Next, pressure reduction was performed on the inside of the reaction vessel until the internal pressure of the reaction vessel reached 8.0 kPa. Next, the contents of the reaction vessel were allowed to react while keeping the internal pressure of the reaction vessel at 8.0 kPa and keeping the temperature of the contents of the reaction vessel at 235° C. until the reaction product (resin) had a Tm of 90° C. Through the above, a non-crystalline resin (AR-1) was obtained. The non-crystalline resin (AR-1) had a Tg of 30° C. and a Tm of 90° C. The non-crystalline resin (AR-1) exhibited no clear heat adsorption peak on a heat adsorption curve plotted using a differential scanning calorimeter, and therefore was determined to be non-crystalline.

(Synthesis of Non-Crystalline Resin (AR-2))

A four-necked flask (reaction vessel) was prepared. The four-necked flask was equipped with a thermometer, a nitrogen inlet tube, a stirrer (stainless steel stirring impeller), and a falling-type condenser (heat exchanger). The reaction vessel was charged with 100.0 g of bisphenol A ethylene oxide adduct (average number of moles added of ethylene oxide: 2 mol), 100.0 g of bisphenol A propylene oxide adduct (average number of moles added of propylene oxide: 2 mol), 60.0 g of terephthalic acid, and 54.0 g of tin(II) 2-ethylhexanoate. Next, a nitrogen atmosphere was created in the inside of the reaction vessel and then the reaction vessel was heated under stirring of the contents of the reaction vessel until the contents of the reaction vessel reached a temperature of 235° C. Next, the contents of the reaction vessel were stirred while maintaining the nitrogen atmosphere in the inside of the reaction vessel and keeping the temperature of the contents of the reaction vessel at a temperature of 235° C. to cause a condensation polymerization reaction of the contents of the reaction vessel. The condensation polymerization reaction was allowed to continue until all the resin raw materials (bisphenol A ethylene oxide adduct, bisphenol A propylene oxide adduct, and terephthalic acid) were dissolved. Next, 10.0 g of trimellitic anhydride was added into the reaction vessel. Next, pressure reduction was performed on the inside of the reaction vessel until the internal pressure of the reaction vessel reached 8.0 kPa. Next, the contents of the reaction vessel were allowed to react while keeping the internal pressure of the reaction vessel at 8.0 kPa and keeping the temperature of the contents of the reaction vessel at 235° C. until the reaction product (resin) had a Tm of 110° C. Through the above, a non-crystalline resin (AR-2) was obtained. The non-crystalline resin (AR-2) had a Tg of 50° C. and a Tm of 110° C. The non-crystalline resin (AR-2) had a cross-linking structure derived from trimellitic acid. The non-crystalline resin (AR-2) exhibited no clear heat adsorption peak on a heat adsorption curve plotted using a differential scanning calorimeter, and therefore was determined to be non-crystalline.

(Preparation of External Additive Particles (A-1))

A four-necked flask (reaction vessel) was prepared. The four-necked flask was equipped with a stirrer, a condenser, a thermometer, and a nitrogen inlet tube. The reaction vessel was charged with 400.0 parts by mass of ion exchange water and 0.5 parts by mass of dodecyltrimethyl ammonium chloride being an emulsifier, and the emulsifier was dissolved in the ion exchange water. Next, a nitrogen atmosphere was created in the inside of the reaction vessel and then the reaction vessel was heated until the contents of the reaction vessel reached a temperature of 75° C. Next, 0.2 parts by mass of 2,2'-azobis(2-amidinopropane)hydrochloride being a polymerization initiator and 10.0 parts by mass of ion exchange water were added into the reaction vessel. Next, a raw material mixed liquid was dripped into the reaction vessel over 1 hours. The raw material mixed liquid was a mixture of 25.0 parts by mass of methyl methacrylate, 25.0 parts by mass of 3-(trimethoxysilyl)propyl methacrylate being the specific monomer, and 50.0 parts by mass of ethylene glycol dimethacrylate being the cross-linking agent. Next, the contents of the reaction vessel were allowed to react at 75° C. for 3 hours. Next, the reaction vessel was heated until the temperature of the contents of the reaction vessel reached 85° C. and then the contents of the reaction vessel kept at 85° C. were stirred for 3 hours to obtain an emulsion containing resin particles. The resultant emulsion was dried using a spray dryer (product of OKAWARA MFG CO., LTD.), and then the dried product was broken up using a jet mill (product of Nippon Pneumatic Mfg. Co., Ltd.). Through the above, external additive particles (A-1) being the specific resin particles with a number average primary particle diameter of 180 nm were obtained.

(Preparation of External Additive Particles (A-2) to (A-8))

External additive particles (A-2) to (A-8) being the specific resin particles were prepared according to the same method as that for preparing the external additive particles (A-1) in all aspects other than the following changes. In the preparation of the external additive particles (A-2) to (A-8), the amount of each component used in the raw material mixed liquid was changed to those shown in Tables 1 and 2 shown below. Tables 1 and 2 below also show the number average primary particle diameter of each type of the external additive particles (A-1) to (A-8) and the later-described external additive particles (B-1) and (B-2).

(Preparation of External Additive Particles (B-1))

A four-necked flask (reaction vessel) was prepared. The four-necked flask was equipped with a stirrer, a condenser, a thermometer, and a nitrogen inlet tube was prepared. The reaction vessel was charged with 400.0 parts by mass of ion exchange water and 0.5 parts by mass of dodecyltrimethyl ammonium chloride being an emulsifier, and the emulsifier was dissolved in the ion exchange water. Next, a nitrogen atmosphere was created in the inside of the reaction vessel and the reaction vessel was heated until the contents of the reaction vessel reached a temperature of 75° C. Next, 0.2 parts by mass of 2,2'-azobis(2-amidinopropane)hydrochloride being a polymerization initiator and 10.0 parts by mass of ion exchange water were added into the reaction vessel. Next, a raw material mixed liquid was dripped into the reaction vessel over 1 hour. The raw material mixed liquid was a mixture of 25.0 parts by mass of methyl methacrylate. 25.0 parts by mass of styrene, and 50.0 parts by mass of ethylene glycol dimethacrylate being the cross-linking agent. Next, the contents of the reaction vessel were allowed to react at 75° C. for 3 hours. Next, the reaction vessel was heated until the temperature of the contents of the reaction vessel reached 85° C. and then the contents of the reaction vessel were stirred for 3 hours. Thus, an emulsion containing resin particles was obtained. The resultant emulsion was dried using a spray dryer (product of OKAWARA MFG CO., LTD.). The dried product was broken up using a jet mill (product of Nippon Pneumatic Mfg. Co., Ltd.) then. Through the above, external additive particles (B-1) being the resin particles with a number average primary particle diameter of 170 nm were obtained.

(Preparation of External Additive Particles (B-2))

A reaction vessel made from glass and equipped with a stirrer, two dripping nozzles, and a thermometer was charged with 84.5 parts by mass of methanol and 15.5 parts by mass of a 10% by mass aqueous ammonium solution. Next, the temperature of the resultant mixed liquid (ammonia concentration: 0.744 mol/L) was adjusted to 25° C. Next, tetramethoxysilane (TMOS) and a 6.0% by mass aqueous ammonium solution were dripped into the reaction vessel using the individual dripping nozzles. The dripping of the tetramethoxysilane (TMOS) and the dripping of the 6.0% by mass aqueous ammonium solution started simultaneously, and were each continued for 29 minutes. In the dripping, the dripping rate of the tetramethoxysilane was set to 1.32 parts by mass/min. The dripping rate of the 6.0% by mass aqueous ammonium solution was set to 0.50 parts by mass/min. The position where the tetramethoxysilane was dripped and the position where the 6.0% by mass aqueous ammonium solution was dripped were set to be 15 cm separate from each other on the surface of the mixed liquid. Through the above, a suspension containing silica particles was obtained. The silica particles in the obtained suspension had a number average primary particle diameter of 140 nm.

Next, heat distillation was performed on the suspension in the reaction vessel to evaporate 84.5 parts by mass (an amount equivalent to the amount of methanol) of a solvent contained in the suspension. After the heat distillation, 84.5 parts by mass of deionized water (DIW) was added to the suspension in the reaction vessel and then freeze drying was performed on the suspension using a freeze dryer. Through the above, hydrophilic silica particles were obtained. Next, 50 parts by mass of trimethylsilane was added to the hydrophilic silica particles in the reaction vessel. Then, the reaction vessel was heated under stirring of the resultant mixture until the temperature of the mixture reached 150° C. Next, the mixture was allowed to react at 150° C. for 2 hours. Through the above, external additive particles (B-2) being inorganic particles with a number average primary particle diameter of 180 nm were obtained.

TABLE 1

| | External additive particles | A-1 | A-2 | A-3 | A-4 | A-5 |
|---|---|---|---|---|---|---|
| Other monomer | Methyl methacrylate | 25 | 20 | 25 | 25 | — |
| | Styrene | — | 10 | — | — | — |
| | Ethyl acrylate | — | — | — | — | 25 |
| | Butyl acrylate | — | — | — | — | — |
| | 2-Hydroxyethyl acrylate | — | — | — | — | — |
| Specific monomer | 3-(Trimethoxysilyl)propyl methacrylate | 25 | 20 | — | — | 25 |
| | 3-(Methyldimethoxysilyl)propyl methacrylate | — | — | 25 | — | — |
| | 3-(Trimethoxysilyl)propyl acrylate | — | — | — | 25 | — |
| Cross-linking agent | Ethylene glycol dimethacrylate | 50 | 50 | 50 | 50 | 50 |
| | Divinylbenzene | — | — | — | — | — |
| Number average primary particle diameter [nm] | | 180 | 160 | 170 | 170 | 180 |

TABLE 2

| | External additive particles | A-6 | A-7 | A-8 | B-1 | B-2 |
|---|---|---|---|---|---|---|
| Other monomer | Methyl methacrylate | — | 25 | — | 25 | — |
| | Styrene | — | — | — | 25 | — |
| | Ethyl acrylate | — | — | 35 | — | — |

TABLE 2-continued

| External additive particles | | A-6 | A-7 | A-8 | B-1 | B-2 |
|---|---|---|---|---|---|---|
| | Butyl acrylate | 20 | — | 40 | — | — |
| | 2-Hydroxyethyl acrylate | 5 | — | — | — | — |
| Specific | 3-(Trimethoxysilyl)propyl methacrylate | 25 | 25 | 25 | — | — |
| monomer | 3-(Methyldimethoxysilyl)propyl methacrylate | — | — | — | — | — |
| | 3-(Trimethoxysilyl)propyl acrylate | — | — | — | — | — |
| Cross-linking | Ethylene glycol dimethacrylate | 50 | — | — | 50 | — |
| agent | Divinylbenzene | — | 50 | — | — | — |
| Number average primary particle diameter [nm] | | 180 | 180 | 160 | 170 | 180 |

<Toner Preparation>

Toners of Examples 1 to 8 and Comparative Examples 1 to 3 were prepared by the following methods. First, toner mother particles to be used for toner preparation were prepared.

(Toner Core Formation)

Using an FM mixer ("FM-20B", product of Nippon Coke & Engineering Co., Ltd.), 35 parts by mass of the non-crystalline resin (AR-1), 35 parts by mass of the non-crystalline resin (AR-2), 12 parts by mass of the crystalline resin (CR-1), 9 parts by mass of a releasing agent ("NISSAN ELECTOL (registered Japanese trademark) WEP-8", product of NOF Corporation, ester wax), and 9 parts by mass of a colorant ("MA100", product of Mitsubishi Chemical Corporation, carbon black) were mixed to obtain a mixture.

The resultant mixture was melted and kneaded using a twin screw extruder ("PCM-30", product of Ikegai Corp.) under conditions of a material feeding speed of 100 g/min., a shaft rotational speed of 150 rpm, and a set temperature (cylinder temperature) of 100° C. to obtain a melt-kneaded product. The resultant melt-kneaded product was cooled. The melt-kneaded product thus cooled was coarsely pulverized using a pulverizer ("ROTOPLEX (registered Japanese trademark)", product of Hosokawa Micron Corporation) under a condition of a setting particle diameter of 2 mm to obtain a coarsely pulverized product. The resultant coarsely pulverized product was finely pulverized using a pulverizer ("TURBO MILL Type RS", product of FREUND-TURBO CORPORATION) to obtain a finely pulverized product. The resultant finely pulverized product was classified using a classifier ("ELBOW JET type EJ-LABO", product of Nittetsu Mining Co., Ltd., air classifier utilizing the Coanda effect) to obtain toner cores. The obtained toner cores had a $D_{50}$ of 6.7 μm.

(Shell Layer Formation)

A three-necked flask (reaction vessel) equipped with a thermometer and a stirring impeller was set in a water bath. The reaction vessel was charged with 100 mL of ion exchange water. Next, the contents of the reaction vessel was kept at a temperature of 30° C. using the water bath. Next, 1 g of a thickener ("CMC DAICEL 2200", product of Daicel Miraizu Ltd.) and 10 g of an oxazoline group containing aqueous polymer solution ("EPOCROS (registered Japanese trademark) WS-700", product of NIPPON SHOKUBAI CO., LTD., solid concentration: 25% by mass) being a shell material were added into the reaction vessel. Next, the contents of the reaction vessel were stirred and then 100 g of the aforementioned toner cores were added into the reaction vessel. Next, the contents of the reaction vessel were stirred for 1 hour at a rotational speed of 200 rpm. The reaction vessel was charged with 100 mL of ion exchange water then. Next, 4 mL of a 1% by mass aqueous ammonia solution was added into the reaction vessel for pH adjustment. Next, the temperature of the contents of the reaction vessel was increased under stirring of the contents of the reaction vessel at a rotational speed of 150 rpm. Specifically, the temperature of the contents of the reaction vessel was increased at a heating rate of 0.5° C./min. from the initial temperature of 30° C. to a final temperature reached of 50° C. Next, once the temperature of the contents of the reaction vessel reached 50° C. being the final temperature reached, the temperature of the contents of the reaction vessel was kept at 50° C. for 30 minutes. Next, the contents of the reaction vessel was cooled until the contents of the reaction vessel reached a temperature of 25° C. Through the above, a dispersion containing toner mother particles each including a toner core and a shell layer was obtained.

(Washing)

The dispersion containing the toner mother particles was filtered using a Buchner funnel to collect a wet cake of the toner mother particles. Next, the toner mother particles in the form of the wet cake were re-dispersed in ion exchange water and the resultant solution was filtered using a Buchner funnel (washing). Next, the above washing was further performed 5 times to wash the toner mother particles.

(Drying)

The washed toner mother particles were dried using a continuous surface-modifying apparatus ("COATMIZER (registered Japanese trademark)", product of Freund Corporation) under conditions of a hot air temperature of 45° C. and a flow rate of 2 $m^3$/min. As a result, a powder of dry toner mother particles was obtained.

Example 1

Using an FM mixer ("FM-10B", product of Nippon Coke & Engineering Co., Ltd., capacity: 10 L), 100 parts by mass of the toner mother particles, 3 parts by mass of positively chargeable silica particles ("AEROSIL (registered Japanese trademark) REA90", product of Nippon Aerosil Co., Ltd., contents: dry silica particles rendered positively chargeable by surface treatment, number average primary particle diameter: 20 nm), and 1 part by mass of the external additive particles (A-1) were mixed for 5 minutes. Through the mixing, the external additive (including the positively chargeable silica particles and the external additive particles (A-1)) were attached to the surfaces of the toner mother particles. The toner mother particles with the external additive attached thereto were sifted using a 200-mesh sieve (opening 75 μm). As a result, a toner of Example 1 including the toner particles was obtained.

Examples 2 to 8 and Comparative Examples 1 to 3

Toners of Examples 2 to 8 and Comparative Examples 1 to 3 were prepared according to the same method as that for preparing the toner of Example 1 in all aspects other than that the external additive particles (corresponding external additive particles (A-2) to (A-8), (B-1), and (B-2)) shown in Tables 3 and 4 below were used instead of the external additive particles (A-1). Note that only the silica particles were used as the external additive in preparation of the toner of Comparative Example 3.

<Evaluation>

Transfer efficiency and charge stability of the toners of Examples 1 to 8 and Comparative Examples 1 to 3 were evaluated by the following methods.

[Transfer Efficiency]

Using a ball mill, 100 parts by mass of a developer carrier (carrier for "TASKalfa (registered Japanese trademark) 5550ci" produced by KYOCERA Document Solutions Inc.) and 10 parts by mass of an evaluation toner (one of the toners of Examples 1 to 8 and Comparative Examples 1 to 3) were mixed for 30 minutes. Through the above mixing, an evaluation developer used for evaluation of transfer efficiency was obtained.

A color multifunction peripheral ("TASKalfa (registered Japanese trademark) 5550ci", product of KYOCERA Document Solutions Inc.) was used as an evaluation apparatus for evaluation of transfer efficiency. The evaluation apparatus included a cleaning section. The cleaning section had a function of collecting toner not used for development from the surface of a photosensitive drum. The evaluation developer was loaded into a development device for black color of the evaluation apparatus and a toner for replenishment use (the same toner as the toner contained in the evaluation developer) was loaded into a toner container for black color of the evaluation apparatus. The toner application amount on a solid image to be formed on printing paper using the evaluation apparatus was set to 5 $mg/cm^2$. Evaluation of transfer efficiency was performed at a temperature of 20° C. and a relative humidity of 65%.

First, a mass A of the toner container for black color was measured. Next, continuous printing at a printing rate of 5% was performed on 2000 sheets of printing paper ("$C^2$ PAPER", product of Fuji Xerox Co., Ltd.) using the evaluation apparatus. After the continuous printing, a mass B of the toner container for black color was measured. A value (mass A−mass B) obtained by subtracting the mass B from the mass A was obtained and the obtained value was taken to be a toner consumption amount. Also, a mass of toner collected in the cleaning section was measured and the measured value was taken to be a toner collection amount. Using the following formula, a transfer efficiency was calculated. The transfer efficiency indicates a ratio of an amount of toner actually transferred to the printing paper to the amount of toner used in the continuous printing. The transfer efficiency was evaluated based on the following criteria (Transfer efficiency [% by mass])=100×((toner consumption amount)−(toner collection amount))/(toner consumption amount)

(Criteria for Transfer Efficiency)

Very good (A): transfer efficiency of at least 98% by mass

Good (B): transfer efficiency of at least 90% by mass and less than 98% by mass

Poor (C): transfer efficiency of less than 90% by mass

[Charge Stability]

Using a ball mill, 100 parts by mass of a developer carrier (carrier for "TASKalfa (registered Japanese trademark) 7551ci" produced by KYOCERA Document Solutions Inc.) and 10 parts by mass of an evaluation toner (one of the toners of Examples 1 to 8 and Comparative Examples 1 to 3) were mixed for 30 minutes. Through the above mixing, an evaluation developer used for evaluation of charge stability was obtained.

Only the toner was sucked from the evaluation developer directly after production in a manner to suck 0.10 g (±0.01 g) of the evaluation developer through a sieve (metal mesh) using a Q/m meter ("MODEL 210HS-2A", product of TREK, INC.). Thereafter, an initial charge amount $_A$ [μC/g] of the toner was obtained based on the amount of the sucked toner and the indication (charge amount) of the Q/m meter.

A multifunction peripheral (TASKalfa (registered Japanese trademark) 7551ci", product of KYOCERA Document Solutions Inc.) was used as an evaluation apparatus used for evaluation of charge stability. The evaluation developer was loaded into a development device for black color of the evaluation apparatus, and a toner for replenishment use (the same toner as the toner contained in the evaluation developer) was loaded into a toner container for black color of the evaluation apparatus. The toner application amount of an image to be formed on printing paper using the evaluation apparatus was set to 4 $mg/cm^2$. Evaluation of charge stability was performed at a temperature of 25° C. and a relative humidity of 55%.

Continuous printing at a printing rate of 1% was performed on 100.000 sheets of printing paper using the evaluation apparatus (printing durability test). After the printing durability test, the evaluation developer was taken out of the development device for black color of the evaluation apparatus. Only the toner was sucked from the evaluation developer after the printing durability test in a manner to suck 0.10 g (±0.01 g) of the evaluation developer through a sieve (metal mesh) using a Q/m meter ("MODEL 210HS-2A", product of TREK, INC.). Thereafter, a post-printing charge amount $_B$ [μC/g] of the toner was obtained based on the amount of the sucked toner and the indication (charge amount) of the Q/m meter. A charge amount changing rate was calculated using the following formula. A smaller charge amount changing rate indicates more excellent charge stability of the toner. The charge stability was evaluated based on the following criteria.

(Charge amount changing rate [%])=100×((initial charge amount $_A$)−(post-printing charge amount $_B$)/(initial amount charge $_A$)

(Criteria for Charge Stability)

Very good (A): charge amount changing rate of less than 5%

B (good): charge amount changing rate of at least 5% and less than 10%

Poor (C): charge amount changing rate of at least 10%

TABLE 3

| | | | Example | | | | |
|---|---|---|---|---|---|---|---|
| | | | 1 | 2 | 3 | 4 | 5 |
| External additive | | Type | A-1 | A-2 | A-3 | A-4 | A-5 |
| particles | | Amount [part by mass] | 1 | 1 | 1 | 1 | 1 |
| Evaluation | Transfer | Evaluation value [%] | 98 | 96 | 94 | 91 | 95 |

TABLE 3-continued

| | | | Example | | | | |
|---|---|---|---|---|---|---|---|
| | | | 1 | 2 | 3 | 4 | 5 |
| | efficiency | Evaluation | A | B | B | B | B |
| | Charge | Initial charge $amount_A$ [μC/g] | 43 | 42 | 39 | 41 | 42 |
| | stability | Post-printing charge $amount_B$ [μC/g] | 40 | 39 | 37 | 38 | 39 |
| | | Charge amount changing rate [%] | 7.0 | 7.1 | 5.1 | 7.3 | 7.1 |
| | | Evaluation | B | B | B | B | B |

TABLE 4

| | | | Example | | | Comparative Example | | |
|---|---|---|---|---|---|---|---|---|
| | | | 6 | 7 | 8 | 1 | 2 | 3 |
| External additive | | Type | A-6 | A7 | A-8 | B-1 | B-2 | — |
| particles | | Amount [part by mass] | 1 | 1 | 1 | 1 | 1 | — |
| Evaluation | Transfer | Evaluation value [%] | 96 | 95 | 93 | 87 | 99 | 99 |
| | efficiency | Evaluation | B | B | B | C | A | A |
| | Charge | Initial charge $amount_A$ [μC/g] | 45 | 48 | 41 | 44 | 47 | 44 |
| | stability | Post-printing charge $amount_B$ [μC/g] | 42 | 45 | 37 | 43 | 40 | 33 |
| | | Charge amount changing rate [%] | 6.7 | 6.3 | 9.8 | 2.3 | 14.9 | 25.0 |
| | | Evaluation | B | B | B | A | C | C |

The toners of Examples 1 to 8 each included toner particles. The toner particles each included a toner mother particle and an external additive attached to the surface of the toner mother particle. The external additive included the specific resin particles. The specific resin particles contained a specific resin having an alkoxysilyl group. As shown in Tables 3 and 4, the toners of Examples 1 to 8 were each evaluated as good in transfer efficiency and charge stability.

By contrast, none of the toners of Comparative Examples 1 to 3 had the above features. As such, at least one of transfer efficiency and charge stability was evaluated as poor.

Specifically, the external additive particles (B-1) used for the toner of Comparative Example 1 were resin particles containing a resin not having an alkoxysilyl group. The external additive particles (B-1) did not sufficiently reduce attachment strength of the surface of the toner of Comparative Example 1. As a result, the toner of Comparative Example 1 was evaluated to be poor in transfer efficiently.

The external additive particles (B-2) used for the toner of Comparative Example 2 were inorganic particles. The surface property of the external additive particles (B-2) varied as the toner of Comparative Example 2 was used. As such, the toner of Comparative Example 2 was evaluated to be poor in charge stability.

The toner of Comparative Example 3 did not use the specific resin particles. The silica particles were embedded in the surfaces of the toner mother particles or detached from the surfaces of the toner mother particles as the toner of Comparative Example 3 was used. As such, the toner of Comparative Example 3 was evaluated to be poor in charge stability.

What is claimed is:

1. A toner comprising toner particles, wherein the toner particles each include a toner mother particle and an external additive attached to a surface of the toner mother particle, the external additive includes resin particles, the resin particles contain a resin having an alkoxysilyl group, the resin includes a first repeating unit derived from a monomer having the alkoxysilyl group and a (meth) acryloyl group, the first repeating unit has a percentage content of at least 10% by mass and no greater than 35% by mass relative to all repeating units in the resin, and the resin includes a third repeating unit derived from a cross-linking agent.

2. The toner according to claim 1, wherein the alkoxysilyl group is a trimethoxysilyl group or a methyldimethoxysilyl group.

3. The toner according to claim 1, wherein the resin includes a second repeating unit derived from at least one compound selected from the group consisting of (meth)acrylic acid alkyl ester and styrene.

* * * * *